US012719665B2

(12) United States Patent
Sudo

(10) Patent No.: US 12,719,665 B2
(45) Date of Patent: Aug. 25, 2026

(54) SECURE COMPUTATION APPARATUS, SECURE COMPUTATION METHOD, AND PROGRAM

(71) Applicant: NTT, Inc., Tokyo (JP)

(72) Inventor: Hiroki Sudo, Tokyo (JP)

(73) Assignee: NTT Inc., Tokyo (JP)

( * ) Notice: Subject to any disclaimer, the term of this patent is extended or adjusted under 35 U.S.C. 154(b) by 113 days.

(21) Appl. No.: 18/836,742

(22) PCT Filed: Feb. 16, 2022

(86) PCT No.: PCT/JP2022/006127
§ 371 (c)(1),
(2) Date: Aug. 7, 2024

(87) PCT Pub. No.: WO2023/157117
PCT Pub. Date: Aug. 24, 2023

(65) Prior Publication Data
US 2025/0150265 A1 May 8, 2025

(51) Int. Cl.
*H04L 9/08* (2006.01)
*G06F 21/60* (2013.01)

(52) U.S. Cl.
CPC ............ *H04L 9/085* (2013.01); *G06F 21/602* (2013.01)

(58) Field of Classification Search
CPC ....... H04L 9/085; H04L 2209/46; H04L 9/40; G06F 21/602; G09C 1/00
See application file for complete search history.

(56) References Cited

U.S. PATENT DOCUMENTS

2021/0191927 A1 6/2021 Ikarashi et al.
2022/0350803 A1* 11/2022 Shah .................... G06F 16/248
2023/0409579 A1* 12/2023 Arnold ............. G06F 16/24566

FOREIGN PATENT DOCUMENTS

JP 6989006 B2 1/2022

OTHER PUBLICATIONS

Sudo et al. (2022) "Secure SQL Window Functions" 2022 Symposium on Cryptography and Information Security, Osaka, Japan & Online, Jan. 18-21, 2022, Web Abstract: Updated on Jan. 11, 2022, websites: https://www.iwsec.org/scis/2022/program.html, https://www.iwsec.org/scis/2022/_abst/3E3-2.pdf.

(Continued)

*Primary Examiner* — J. Brant Murphy

(57) ABSTRACT

The secure computation apparatus includes: a former half window frame column generation unit configured to generate, with respect to a vector subVector ($\{\vec{g}\}$, s+1, i} obtained by extracting elements from an (s+1)-th element to an i-th element of $\{\vec{g}\}$, a bit column obtained by an OR operation performed on all bits from the end to each position as a former half window frame flag column $\{\vec{w}^{f}\}$; a latter half window frame column generation unit configured to generate, with respect to a vector subVector ($\{\vec{g}\}$, i+1, t} obtained by extracting elements from an (i+1)-th element to a t-th element of $\{\vec{g}\}$, a bit column obtained by calculating OR of all bits from the head to each position as a latter half window frame flag column $\{\vec{w}^{l}\}$; and a window frame flag column generation unit configured to generate a window frame flag column $\{\vec{w}\}$ by combining the former half window frame flag column $\{\vec{w}^{f}\}$ from the front side and the latter half window frame flag column $\{\vec{w}^{l}\}$ from the rear side having {0} interposed therebetween.

7 Claims, 6 Drawing Sheets

(56) References Cited

OTHER PUBLICATIONS

Sudo et al. (2022) "Secure SQL Window Functions" 2022 Symposium on Cryptography and Information Security, Osaka, Japan & Online, Jan. 18-21, 2022, Web Manuscript: pp. 1-6, Published on Jan. 12, 2024.

Kikuchi et al. (2020) "Secure cross-sector customer-flow invention," 2020 Symposium on Cryptography and Information Security, Kochi, Japan, Jan. 28-31, 2020, pp. 1-8, 2020.

* cited by examiner

SECURE COMPUTATION APPARATUS, SECURE COMPUTATION METHOD, AND PROGRAM

CROSS-REFERENCE TO RELATED APPLICATIONS

This application is a U.S. 371 Application of International Patent Application No. PCT/JP2022/006127, filed on 16 Feb. 2022, the disclosure of which is hereby incorporated herein by reference in its entirety.

TECHNICAL FIELD

The present invention relates to a secure computation apparatus, a secure computation method, and a program for performing secure computation on a database.

BACKGROUND ART

The window function is a function of grouping records according to key attributes and performing totaling or the like in a "window" having a specified width with each row as a reference. For example, in the case of totaling for one column front and back, the input/output shown in Table 1 is obtained. At this time, it is noted that values of other groups are not summed up.

TABLE 1

Input

| Val | Key |
|---|---|
| 1 | A |
| 2 | B |
| 3 | A |
| 1 | C |
| 2 | A |
| 3 | B |
| 1 | B |
| 2 | C |

Output

| sum | Val | Key |
|---|---|---|
| 3 | 1 | A |
| 6 | 2 | A |
| 5 | 3 | A |
| 3 | 1 | B |
| 6 | 2 | B |
| 5 | 3 | B |
| 3 | 1 | C |
| 3 | 2 | C |

Although there is a group-by function as a function similar to the window function, the group-by function performs aggregation into one value for each group, whereas the window function is different in that a result is output by performing totaling within a window frame for each row. PTL 1 and NPL 1 are conventional techniques related to group-By.

CITATION LIST

Patent Literature

[PTL 1] Japanese Patent No. 6989006

Non Patent Literature

[NPL 1] Ryo Kikuchi, Koki Hamada, Dai Ikarashi, Gen Takahashi, "Secure cross-sector customer-flow invention," In SCIS 2020 (2020 Encryption and Information Security Symposium), pp. 1-8, 2020.

SUMMARY OF INVENTION

Technical Problem

A method of realizing the window function on secure computation has not been reported in any literature. Among SQL functions, the window function needs to perform grouping according to key attributes and then perform totaling within a window frame. However, when realized through secure computation, the problem is to perform computation without looking at the content while encrypting grouping and window frame boundaries.

Accordingly, an object of the present invention is to provide a secure computation apparatus capable of generating a window frame flag column for executing a window function on secure computation using low-cost arithmetic operations.

Solution to Problem

A secure computation apparatus of the present invention is a secure computation apparatus for performing arithmetic operations while keeping a database including a key column $\vec{k}$ which is an attribute column and a data column $\vec{v}$ which is a value column concealed.

A group flag column $\vec{g}$ represents a vector in which a value becomes 1 at a position where a value of the key column changes, and a value becomes 0 at other positions, a share of a value x according to replicated secret sharing is represented as $\{x\}$, a current row number is represented by i, a window frame start position is represented by s, and a window frame end position is represented by t, the number of rows of the key column and the data column is set to l, and the current row number i is incremented by one each time all flag column generation processing ends in a range of 0 or more and less than l.

The secure computation apparatus of the present invention includes a former half window frame flag column generation unit, a latter half window frame flag column generation unit, and a window frame flag column generation unit.

The former half window frame column generation unit generates, with respect to a vector subVector $(\{\vec{g}\}, s+1, i)$ obtained by extracting elements from an (s+1)-th element to an i-th element of $\{\vec{g}\}$, a bit column obtained by an OR operation performed on all bits from the end to each position as a former half window frame flag column $\{\vec{w}^{f}\}$.

The latter half window frame column generation unit generates, with respect to a vector subVector $(\{\vec{g}\}, i+1, t)$ obtained by extracting elements from an (i+1)-th element to a t-th element of $\{\vec{g}\}$, a bit column obtained by an OR operation performed on all bits from the head to each position as a latter half window frame flag column $\{\vec{w}^{l}\}$.

The window frame flag column generation unit generates a window frame flag column $\{\vec{w}\}$ by combining the former half window frame flag column $\{\vec{w}^{f}\}$ from the front side and the latter half window frame flag column $\{\vec{w}^{l}\}$ from the rear side having $\{0\}$ interposed between the former half window frame flag column $\{\vec{w}^{f}\}$ and the latter half window frame flag column $\{\vec{w}^{l}\}$.

Advantageous Effects of Invention

According to the secure computation apparatus of the present invention, a window frame flag column for executing a window function on secure computation can be generated using low-cost arithmetic operations.

DESCRIPTION OF EMBODIMENTS

Figure 1:
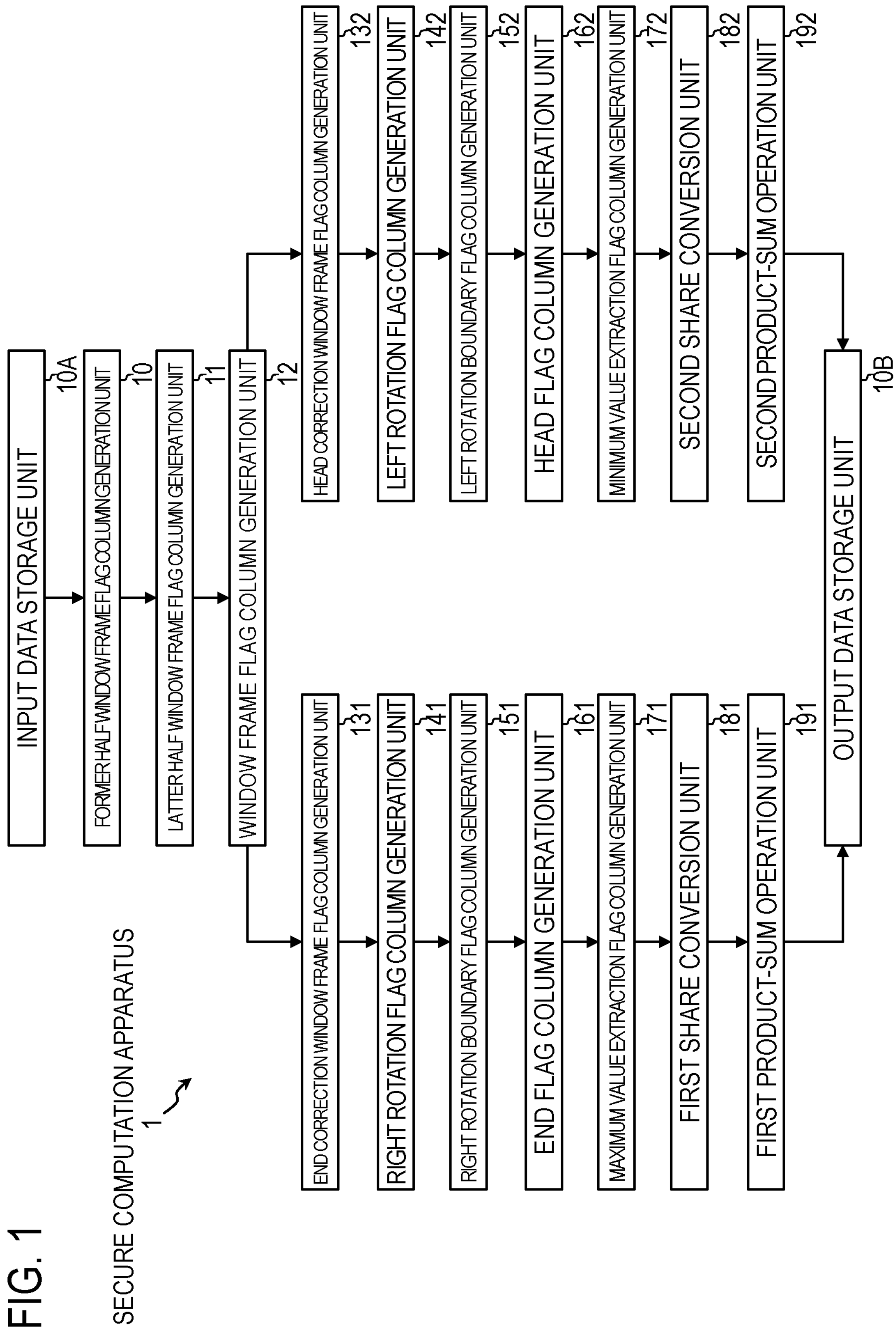
FIG. 1 is a block diagram illustrating a functional configuration of a secure computation apparatus of example 1.

The following describes an example of the present invention in detail. Further, constituent units having the same function are denoted with the same number, and overlapping descriptions thereof are omitted.

<Notation>

The vector is denoted as $v^{\rightarrow}$. An i-th element of the vector is represented as $v_i^{\rightarrow}$. $v^{\rightarrow}|u^{\rightarrow}$ represents combination of $u^{\rightarrow}$ with the end of the vector $v^{\rightarrow}$. $\sigma(v^{\rightarrow})^{\rightarrow})$ represents a vector obtained by substituting vector $v^{\rightarrow}$ with σ.

Further, an operation of extracting vector $v'^{\rightarrow}$ from i-th to j-th elements of vector $v^{\rightarrow}$ is represented as $v'^{\rightarrow}\leftarrow$subVector ($v^{\rightarrow}$, i, j).

c←max(a,b) means that the larger one of values of plaintext a and b is output through computation in plaintext. c←min(a,b) means that the smaller one of values of plaintext a and b is output through computation in plaintext.

<Secret Sharing>

Secret sharing is an encryption method for dividing data into a plurality of values and distributing the same to a plurality of parties. A secure computation apparatus of the following example encrypts data according to (k, n) threshold value secret sharing. (k, n) threshold value secret sharing is a secret sharing method having such a property that data is divided into n random values (called shares), if k or more shares are collected, the original data can be restored, and information of the original data cannot be obtained from less than k shares. Specifically, the secure computation apparatus of the following example uses Shamir secret sharing (Reference NPL 1) or replicated secret sharing (Reference NPL 2 and NPL 3).

(Reference NPL 1: Adi Shamir. How to share a secret. Communications of the ACM, Vol. 22, No. 11, pp. 612-613, 1979.)

(Reference NPL 2: Mitsuru Ito, Akira Saito, and Takao Nishizeki. Secret sharing scheme realizing general access structure. Electronics and Communications in Japan (Part III: Fundamental Electronic Sciences), Vol. 72, No. 9, pp. 56-64, 1989.)

(Reference NPL 3: Ronald Cramer, Ivan Damgard, and Yuval Ishai. Share conversion, pseudorandom secure-sharing and applications to secure computation. In Theory of Cryptography Conference, pp. 342-362. Springer, 2005)

In this specification, a share of a value x by the Shamir secret sharing is represented as [x]]. Note that (( )) is used instead of in [Claims]. A share of the value x by the replicated secret sharing is represented as {x}. Since the replicated secret sharing is particularly efficient for processing of 1-bit data, it will be properly used in the following example. Further, a value obtained by sharing substitution o is represented as <σ>.

<Components>

<<Addition/Subtraction, Constant Multiplication>>

Addition/subtraction and constant multiplication of shares can be computed without requiring communication. The addition/subtraction and constant multiplication are described as follows.

[[x]]+[[y]], c[[x]]

<<Product-Sum Operation>>

The product-sum operation of $a^{\rightarrow}$ and $b^{\rightarrow}$ is written as follows.

$[[c]]\leftarrow$Psum ($[[a^{\rightarrow}]]$, $[[b^{\rightarrow}]]$)

<<Logical Operations>>

An OR operation is an operation having ciphertext {a} and {b} of 1-bit values a and b as inputs and outputting ciphertext of the result c of computation a OR b, and is described as follows.

{c}←Or({a}, {b})

Other logical operations such as an AND operation and an XOR operation are also described in the same manner.

<<Prefix/Suffix OR>>

PrefixOR is an operation for returning a bit column obtained by taking OR of all bits from the head to each position with respect to bit column $b^{\rightarrow}$. That is, when output is $c^{\rightarrow}$, $c_i^{\rightarrow}\leftarrow c_{i-1}^{\rightarrow}$OR$b_i^{\rightarrow}$, where $c_0^{\rightarrow}\leftarrow b_0^{\rightarrow}$. This is written as $\{c^{\rightarrow}\}\leftarrow$PrefixOR($\{b^{\rightarrow}\}$). Conversely, suffixOR is an operation for returning a bit column obtained by taking OR of all bits from the end of $c^{\rightarrow}$ to each position.

<<Equality Determination>>

An equality determination operation is an operation having variance values [[a]], [[b]] of a and b as inputs, and outputting a variance value of a Boolean value c of a==b, and is described as follows.

{c}←Eq([[a]], [[b]])

<<Concealed Stable Sorting>>

Concealed stable sorting is a protocol for stably sorting vectors. The concealed stable sorting is composed of the following algorithm. $<\pi>\leftarrow$GenPerm($[[k^{\rightarrow}]]$): Substitution n for stably sorting key column $k^{\rightarrow}$ in ascending order is output. $[[v'^{\rightarrow}]]\leftarrow$Sort($<\pi>$, $[[v^{\rightarrow}]]$): π is applied to $v^{\rightarrow}$ and rearranged $[[v'^{\rightarrow}]]$ is output. As a high-speed mounting method for realizing this, Reference NPL 4 and the like are known.

(Reference NPL 4: Dai Ikarashi, Koki Hamada, Ryo Kikuchi, and Koji Chida, "Design and implementation of ultra-fast secure computation sorting: the day secure computation is on par with scripting languages," CSS 2017 papers, 2017(2), pp. 1-8, 2017 Oct. 16)

In a case in which a set of a plurality of columns is used as a key column, it is written as follows. Here, it is assumed that a previously designated key is preferentially sorted.

$<\pi>\leftarrow$GenPerm($[[k_1^{\rightarrow}]]$, $[[k_2^{\rightarrow}]]$)

<<Modulus Conversion>>

Processing of converting 1-bit {a} into [[a]] is described as follows.

[[a]]←ModConv({a})

Specifically, the method of Kikuchi et al., described in Reference NPL 5 is known.

(Reference NPL 5: Ryo Kikuchi, Dai Ikarashi, Takahiro Matsuda, Koki Hamada, and Koji Chida. Efficient bitdecomposition and modulus-conversion protocols with an honest majority. In Willy Susilo and Guomin Yang, editors, Information Security and Privacy, pp. 64-82, Cham, 2018. Springer International Publishing.)

<<Common Processing>>

Common processing is processing for returning a flag column in which a group head element becomes 1, a data column rearranged for each group, and a key column when a key column and a data column are given and grouped with the same value of the key column as an output. Specifically, this can be realized by the method of Kikuchi et al. (NPL 1). Details of the method of Kikuchi et al. (NPL 1) are shown in Algorithm 1 since it is closely related to the method which will be disclosed in the following examples.

[Algorithm 1: GroupByCommon]

Input: key column $[[\vec{k}]]$, data column $[[\vec{v}]]$, (where $[[\vec{k}]$ is the number 1 of rows, and $[[\vec{v}]$ is the number 1 of rows) Output: grouped key column $[[\vec{k'}]]$, grouped data column $[[\vec{v'}]]$, group flag column $\{\vec{g}\}$ (where $[[\vec{k'}]]$ is the number 1 of rows, $[[\vec{v'}]]$ is the number 1 of rows, and $\{\vec{g}\}$ is a vector having a length l which is 1 only at the head position of a group and 0 in other cases)

1: $\langle\sigma\rangle \leftarrow$ GenPerm($[\vec{k}]$, $[\vec{v}]$)

2: $[\vec{k'}] \leftarrow$ Sort($[\vec{k}]$, $\langle\sigma\rangle$)

3: $[\vec{v'}] \leftarrow$ Sort($[\vec{v}]$, $\langle\sigma\rangle$)

4: $\{\vec{eq}\}_0 \leftarrow \{0\}$; $\{\vec{g}\}_0 \leftarrow \{1\}$

5: for $1 \le i < l$ do in parallel

6: $\{\vec{eq}\}_i \leftarrow$ Eq($[[\vec{k}]]_{i-1}$, $[[\vec{k}]]_i$)

7: $\{\vec{g}\}_i \leftarrow$ Not($\{\vec{eq}\}_i$)

8: end for

9: return $[[\vec{k'}]]$, $[[\vec{v'}]]$, $\{\vec{g}\}$

[Algorithm 1 End]

The first line of Algorithm 1 indicates processing of outputting a substitution σ for concealing and stably sorting a key column $\vec{k}$ and a data column $\vec{v}$ in ascending order according to GenPerm.

The second line indicates processing of concealing and stably sorting the key column $[\vec{k}]$ by σ, and outputting the sorted result $[[\vec{k'}]]$.

The third line indicates processing of concealing and stably sorting the data column $[[\vec{v}]]$ by σ and outputting the sorted result $[[\vec{v'}]]$.

The fourth line indicates processing of setting the value $\{\vec{eq}\}_0$ of the head of a vector $\{\vec{eq}\}$ to $\{0\}$, and setting the value $\{\vec{g}\}_0$ of the head of a group flag column $\{\vec{g}\}$ to $\{1\}$.

The fifth line indicates that processing of the sixth and seventh lines is repeatedly executed.

The sixth line indicates that the i-th value $\{\vec{eq}\}_i$ of the vector $\{\vec{eq}\}$ is set to Eq($[[\vec{k}]]_{i-1}$, $[[\vec{k}]]_i$), that is, 1 if the (i−1)-th value $[[\vec{k}]]_{i-1}$ of the key column is equal to the i-th value $[[\vec{k}]]_i$ and 0 if not. Therefore, the vector $\vec{eq}$ is a vector characterized in that 1 continues until approaching a change point of the value of a key column, 0 appears at the position where the value of the key column changes, and 1 continues until a change point of the value of the next key column.

The seventh line indicates a vector in which the i-th value $\{\vec{g}\}_i$ of the group flag column $\{\vec{g}\}$ is set to Not ($\{\vec{eq}\}_i$), that is, the value of the group flag column $\vec{g}$ is 1 at a position where the value of the key column changes, and the value is 0 at other positions.

The eighth line indicates the end of repetitive processing, and the ninth line represents the grouped key column $[[\vec{k'}]]$, the grouped data column $[[\vec{v'}]]$, and the group flag column $\{\vec{g}\}$, which are outputs of Algorithm 1.

Hereinafter, details of a method of generating a window frame flag column for executing the window function on secure computation, which is a unique method of the present invention, is shown in Algorithm 2.

[Algorithm 2: GenWindowFrame]

Input: group flag column $\{\vec{g}\}$, current row number i, window frame start position s, and window frame end position t (where $s \le i \le t$)

Output: window frame flag column $\{\vec{w}\}$

1: $\{\vec{w^f}\} \leftarrow$ SuffixOR(subVector($\{\vec{g}\}$, s+1, i))

2: $\{\vec{w^l}\} \leftarrow$ PrefixOR(subVector($\{\vec{g}\}$, i+1, t))

3: $\{\vec{w}\} \leftarrow \{\vec{w^f}\} | \{0\} | \{\vec{w^l}\}$

4: return $\{\vec{w}\}$

[Algorithm 2 End]

The first line of Algorithm 2 indicates that a bit column obtained by SuffixOR, that is, an OR operation performed on all bits from the end to each position, is generated as a former half window frame flag column $\{\vec{w^f}\}$ with respect to a vector subVector ($\{\vec{g}\}$, s+1, i) obtained by extracting elements from the ((s+1)-th) element one element ahead of the window frame start position of $\{\vec{g}\}$ to the i-th element. Therefore, in a case where a position where the value of a key column changes appears on the way from the end to the head, all elements positioned at the head from this position are 1, and thus results of 1, . . . , 1, 0, . . . , 0 are obtained.

The second line indicates that a bit column obtained by PrefixOR, that is, an OR operation performed on all bits from the head to each position, is generated as a latter half window frame flag column $\{\vec{w^l}\}$ with respect to a vector subVector ($\{\vec{g}\}$, i+1, t) obtained by extracting elements from the (i+1)-th to the window frame end position (t-th) of $\{\vec{g}\}$. Therefore, in a case where a position where the value of a key column changes appears on the way from the head to the end, all elements positioned at the end from this position are 1, and thus results of 0, . . . , 0, 1, . . . , 1 are obtained.

The third and fourth lines indicate that $\{\vec{w^f}\}$ is combined from the front side and $\{\vec{w^l}\}$ is combined from the rear side with $\{0\}$ interposed therebetween to generate $\{\vec{w}\}$ and output it. That is, $\{0\}$ corresponds to a position corresponding to the current row number. Vector $\vec{w}$ indicates the value 0 for elements belonging to a group including the current row number and the value 1 for elements belonging to a group different from the group including the current row number. For example, when elements corresponding to the current row number are represented by sandwiching with > <, an output example such as 1, . . . , 1, 0, . . . , >0<, . . . , 0, 1, . . . , 1 can be obtained as vector $\vec{w}$.

Details of a method of computing a Max operation for the window function are shown in the following Algorithm 3.

[Algorithm 3: WindowMax]

Input: key column $[[\vec{k}]]$, data column $[[\vec{v}]]$, window frame start position offset poffset, and window frame end position offset foffset (where $[[\vec{k}]]$ is the number 1 of rows, and $[[\vec{v}]]$ is the number 1 of rows.)

Output: grouped key column $[[\vec{k'}]]$ and totaling result column $[[\vec{u}]]$ (where $[[\vec{k'}]]$ is the number 1 of rows, and $[[\vec{u}]]$ is the number 1 of rows).

1: $[[\vec{k'}]]$, $[[\vec{v'}]]$, $\{\vec{g}\} \leftarrow$ GroupByCommon($[[\vec{k}]]$, $[[\vec{v}]]$)

2: for $0 \le i < l$ do in parallel

3: s←max(i−poffset, 0)

4: t←min(i+foffset, l−1)

5: $\{\vec{w}\} \leftarrow$ GenWindowFrame($\{\vec{g}\}$,i,s,t)

6: $\{\vec{w^{max'}}\} \leftarrow \{\vec{w}\} | \{1\}$

7: $\{\vec{a^{max}}\}_0 \leftarrow \{1\}$

8: for $1 \le j < t-s+1$ do in parallel

9: $\{\vec{a^{max}}\}_j \leftarrow \{\vec{w^{max'}}\}_{j-1}$

10: $\{\vec{b^{max}}\}_j \leftarrow$ Xor($\{\vec{a^{max}}\}_j$, $\{\vec{w^{max'}}\}_j$)

11: $\{m^{max'\rightarrow}\}_j \leftarrow$ And($\{b^{max\rightarrow}\}_j$, $\{w^{max'\rightarrow}\}_j$)
12: end for
13: $\{m^{max\rightarrow}\} \leftarrow$ subVector($\{m^{max'\rightarrow}\}$, 1, t−s)
14: $[m^{max\rightarrow}] \leftarrow$ ModConv($\{m^{max\rightarrow}\}$)
15: $[[\vec{u}]]_i \leftarrow$ PSum($[[m^{max\rightarrow}]]$, subVector($[[\vec{v}']]$,s,t))
16: end for
17: return $[[\vec{k}']]$, $[[\vec{u}]]$

[Algorithm 3 End]

The first line of Algorithm 3 indicates processing of generating a grouped key column $[[\vec{k}']]$, a grouped data column $[[\vec{v}']]$, and a group flag column $\{\vec{g}\}$ according to Algorithm 1.

The second line indicates that processing up to the sixteenth line is repeatedly executed.

The third line indicates processing of setting i-poffset, that is, a position offset from the current row number i by the window frame start position offset poffset, as a window frame start position s, and computing the window frame start position s as s←max(i−poffset,0) in order to process all exceptions where i-poffset is equal to or less than 0 as 0.

The fourth line indicates processing of setting i+foffset, that is, a position offset from the current row number i by the window frame end position offset foffset, as a window frame end position t, and computing the window frame end position t as t←min(i+foffset,l−1) in order to process all exceptions where i+foffset is equal to or greater than l−1 as l−1.

The fifth line indicates processing of computing the window frame flag column $\{\vec{w}\}$ by Algorithm 2.

The sixth line indicates processing of combining {1} with the end of the window frame flag column $\{\vec{w}\}$ to generate an end correction window frame flag column $\{w^{max'\rightarrow}\}$. In the sixth line, 1 added to the end serves as "guard" and corresponds to exception processing in a case where there is no 1 at the end of the original bit column.

The seventh line indicates processing of setting {1} to the 0-th row of a right rotation flag column $\{a^{max\rightarrow}\}$ to be used for the subsequent XOR operation.

The eighth line indicates that processing up to the ninth to twelfth lines is repeatedly executed.

The ninth line indicates processing of generating the right rotation flag column $\{a^{max\rightarrow}\}$ using elements from the first row to the (t−s)-th row of the right rotation flag column $\{a^{max\rightarrow}\}$ as elements from the 0-th row to the (t−s−1)-th row of $\{w^{max'\rightarrow}\}$. Therefore, $\{a^{max\rightarrow}\}$ is a flag column generally obtained by shifting each element of $\{w^{max'\rightarrow}\}$ to the right by one column, and in a case where $w^{max'\rightarrow}$=(1, 1, 1, 0, 0, 0, 1, 1, 1, 1), for example, $a^{max\rightarrow}$=(1, 1, 1, 1, 0, 0, 0, 1, 1, 1), resulting in shifting of all element values to the right by one column.

However, in this case, the 0-th row of $a^{max\rightarrow}$ is set to 1 by processing of the seventh line of Algorithm 3, and the element at the end of $w^{max'\rightarrow}$ is not left in $a^{max\rightarrow}$.

The tenth line indicates processing of generating a right rotation boundary flag column $\{b^{max\rightarrow}\}$ by performing an XOR operation on the right rotation flag column $\{a^{max\rightarrow}\}$ and the end correction window frame flag column $\{w^{max'\rightarrow}\}$. For example, in the case of $w^{max'\rightarrow}$=(1,1,1,0,0,0,1,1,1,1) and $a^{max\rightarrow}$=(1,1,1,1,0,0,0,1,1,1) described above, it can be ascertained that the group boundary can be extracted because $b^{max\rightarrow}$=(0,0,0,1,0,0,1,0,0,0).

The eleventh line indicates processing of generating an end flag column $\{m^{max'\rightarrow}\}$ by performing an AND operation on the right rotation boundary flag column $\{b^{max\rightarrow}\}$ and the end correction window frame flag column $\{w^{max'\rightarrow}\}$. For example, in the case of the example of $w^{max'\rightarrow}$=(1,1,1,0,0,0,1,1,1,1) and $b^{max\rightarrow}$=(0,0,0,1,0,0,1,0,0,0) described above, $m^{max'\rightarrow}$==(0,0,0,0,0,0,1,0,0,0) is obtained according to an AND operation, and thus it can be ascertained that only the end position of the group can be specified.)

The twelfth line indicates the end of repetitive processing, and the thirteenth line indicates that a subVector ($\{m^{max'\rightarrow}$, 1, t−s) obtained by extracting elements from the element of the first row to the (t−s)-th row of $\{m^{max'\rightarrow}\}$ is generated as a maximum value extraction flag column $\{m^{max\rightarrow}\}$.

The fourteenth line indicates processing of converting $\{m^{max\rightarrow}\}$, which is a share of replicated secret sharing, into a share $[[m^{max\rightarrow}]]$ of Shamir secret sharing. The fourteenth line is performed in order to execute PSum processing in the subsequent fifteenth line.

The fifteenth line indicates execution of PSum of a subVector ($[[\vec{v}']]$, s, t) obtained by extracting elements from the window frame start position s to the window frame end position t of the data column $[[\vec{v}']]$ sorted in ascending order, and $[[m^{max\rightarrow}]]$. Accordingly, the value remains as a product only at the end position of the group and all the other products become 0, and thus a total result column $[[\vec{u}]]$) indicates a MAX value appearing at the end of the group.

The sixteenth line indicates the end of repetitive processing, and the seventeenth line indicates processing of outputting the grouped key column $[[\vec{k}']]$ and the total result column $[[\vec{u}]]$.

By executing GroupByCommon in the first line, data columns are sorted in ascending order in the group. For this reason, in order to compute Max within the window frame, it is sufficient to acquire the element at the end in the group and the window frame.

First, $\{\vec{w}\}$ which is a flag column in which a position that is a totaling target is 0 and a position that is not a totaling target is 1 in the fifth line is generated. Although $\{\vec{g}\}$ is a flag column in which the element at the end of the group is indicated by 1 in NPL 1, if it is regarded as a flag associated with the boundary of the group, it can be regarded as a bit column in which the group boundary is indicated by 1. Then, as shown in Algorithm 2, a flag column in which elements beyond the group boundary become 1 by performing Suffix/Prefix OR in the vertical direction can be generated. However, the initial value of the current row is set to 0 in order to always set the current row to a totaling target.

This flag column is utilized, and a flag column in which a position corresponding to such an element becomes 1 is computed in the sixth to twelfth lines. According to the generation method, in $\vec{w}$, one or more 0s are arranged after 0 or more 1s, and then 0 or more 1s are arranged. Since the end of the window frame is a place where 1 and 0 are switched, a necessary flag column $\{m^{max'\rightarrow}\}$ can be computed by computing XOR and AND using the original bit column and the bit column rotated by one.

Either the head or the end can be acquired in accordance with the direction of rotation, and since the end corresponds to a Max value when sorted in ascending order, it rotates to the right. In the fifteenth line, the value of Max is obtained using a flag column in which the position of Max is 1. Although If Then (which requires multiplication) is applied to the vector $[[\vec{v}']]$ in order in a simple method, not only the computation cost but also the communication quantity can be reduced using PSum.

Next, details of a method of computing a Min operation for the window function are shown in the following Algorithm 4.

[Algorithm 4: WindowMin]

Input: A key column $[[\vec{k}]]$, a data column $[[\vec{v}]]$, a window frame start position offset poffset, and a window frame end position offset foffset (where $[[\vec{k}]]$ is the number l of rows, and $[[\vec{v}]]$ is the number l of rows)

Output: A grouped key column $[[\vec{k'}]]$ and a totaling result column $[[\vec{u}]]$ (where $[[\vec{k'}]]$ is the number 1 of rows, and $[[\vec{u}]]$ is the number 1 of rows)

1: $[[\vec{k'}]]$, $[[\vec{v'}]]$, $\{\vec{g}\}\leftarrow$GroupByCommon($[[\vec{k}]]$, $[[\vec{v}]]$)
2: for $0\le i<l$ do in parallel
3: $s\leftarrow\max(i-poffset,0)$
4: $t\leftarrow\min(i+foffset,l-1)$
5: $\{\vec{w}\}\leftarrow$GenWindowFrame($\{\vec{g}\}$,i,s,t)
6: $\{\vec{w}^{min'}\}\leftarrow\{1\}|\{\vec{w}\}$
7: $\{\vec{a}^{min}\}_{t-s-1}\leftarrow\{1\}$
8: for $0\le j<t-s$ do in parallel
9: $\{\vec{a}^{min}\}_j\leftarrow\{\vec{w}^{min'}\}_{j+1}$
10: $\{\vec{b}^{min}\}_j\leftarrow$Xor($\{\vec{a}^{min}\}_j$, $\{\vec{w}^{min'}\}_j$)
11: $\{\vec{m}^{min'}\}\leftarrow$And($\{\vec{b}^{min}\}_j$, $\{\vec{w}^{min'}\}_j$)
12: end for
13: $\{\vec{m}^{min}\}\leftarrow$subVector($\{\vec{m}^{min'}\}$, 0, $t-s-1$)
14: $[[\vec{m}^{min}]]\leftarrow$ModConv($\{\vec{m}^{min}\}$)
15: $[[\vec{u}]]_i\leftarrow$PSum($[[\vec{m}^{min}]]$, subVector($[[\vec{v'}]]$,s,t))
16: end for
17: return $[[\vec{k'}]]$, $[[\vec{u}]]$

[Algorithm 4 End]

Since Algorithm 4 has many pieces of processing common to Algorithm 3, only processing different from Algorithm 3 will be described. In the case of Min, {1} (guard) is combined with the head of the window frame flag column $\{\vec{w}\}$ to generate a head correction window frame flag column $\{\vec{w}^{min'}\}$ (sixth line) in order to obtain the head element in the group and the window frame. Further, a left rotation flag column $\{\vec{a}^{min}\}$ is generated using elements from the 0-th row to the (t−s−1)-th row of a left rotation flag column $\{\vec{a}^{min}\}$ as elements from the first row to the (t−s)-th row of $\{\vec{w}^{min'}\}$, thereby rotating to the left (ninth line).

In SQL, there are "UNBOUNDED PRECEDINGS" indicating that a window frame start position starts from the beginning in a group as an option for designating a window frame start position, and there are "UNBOUNDED PRECEDINGS" indicating that a window frame end position is up to the end in the group as an option for designating a window frame end position. Since a group flag is not a public value, poffset and foffset cannot be designated at the beginning/end in the group, but the same result can be obtained by setting the window frame start position offset to poffset=−n in the case of "UNBOUNDED PRECEDINGS" and setting the window frame end position offset foffset=n in the case of "UNBOUNDED FOLLOWING." In the case of designating "CURRENT ROW" indicating the current row as an option for designating a start/end position, the window frame start position/end position offset are set to 0.

Example 1

A configuration of a secure computation apparatus of example 1 for executing the Max/Min operation for the window function by executing Algorithm 3 and 4 will be described below with reference to FIG. 1. As shown in the figure, the secure computation apparatus 1 of the present example includes an input data storage unit 10A, a former half window frame flag column generation unit 10, a latter half window frame flag column generation unit 11, a window frame flag column generation unit 12, an end correction window frame flag column generation unit 131, a right rotation flag column generation unit 141, a right rotation boundary flag column generation unit 151, an end flag column generation unit 161, a maximum value extraction flag column generation unit 171, a first share conversion unit 181, a first product-sum operation unit 191, a head correction window frame flag column generation unit 132, a left rotation flag column generation unit 142, a left rotation boundary flag column generation unit 152, a head flag column generation unit 162, a minimum value extraction flag column generation unit 172, a second share conversion unit 182, a second product-sum operation unit 192, and an output data storage unit 10B.

<Input Data Storage Unit 10A>

The input data storage unit 10A stores data input to the secure computation apparatus in advance. In the present example, on the assumption that Algorithm 1 has already been executed, the input data storage unit 10A stores a grouped key column $[\vec{k'}]$, a grouped data column $[\vec{v'}]$, and a group flag column $\{\vec{g}\}$. Further, the input data storage unit 10A stores in advance a window frame start position offset poffset and a window frame end position offset foffset which are parameters arbitrarily set by a user.

In a case where Algorithm 1 is also executed in the secure computation apparatus, it is sufficient for the input data storage unit 10A to store a key column $[[\vec{k}]]$, a data column $[[\vec{v}]]$, the window frame start position offset poffset, and the window frame end position offset foffset in advance.

Figure 2:
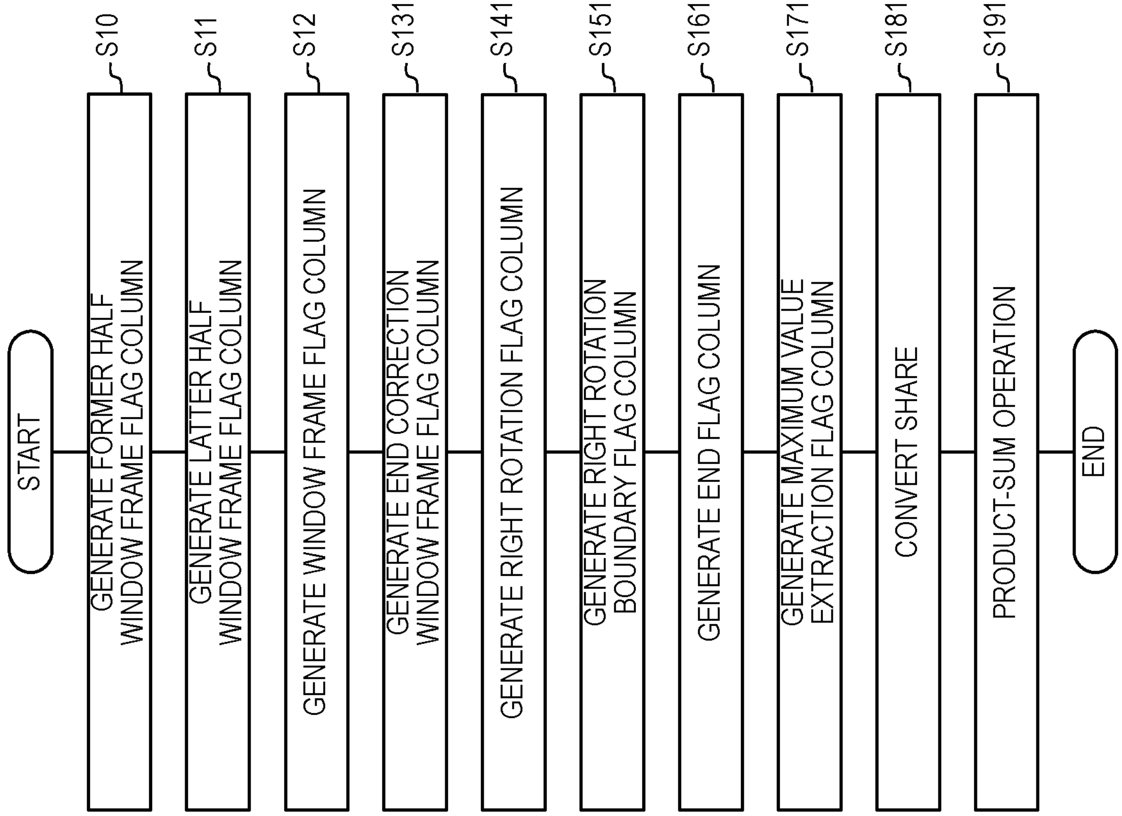
FIG. 2 is a flowchart illustrating a Max calculation operation for a window function of the secure computation apparatus of example 1.
Figure 3:
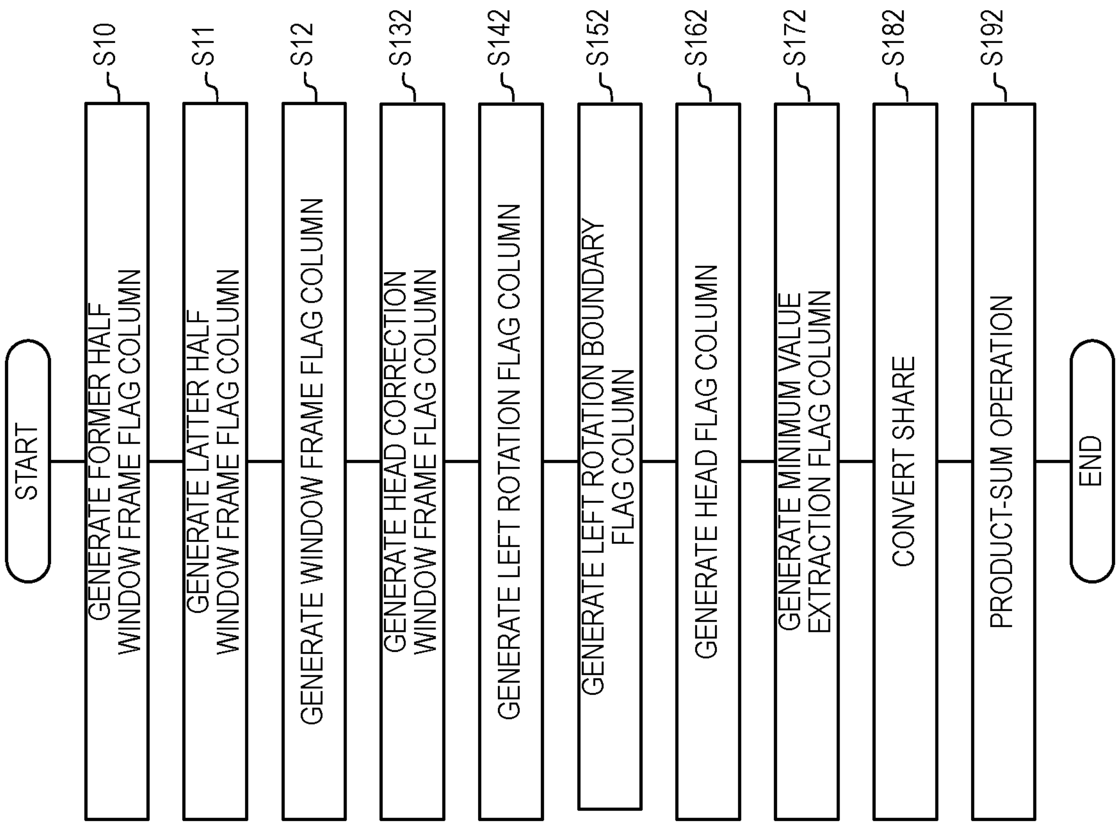
FIG. 3 is a flowchart illustrating a Min calculation operation for the window function of the secure computation apparatus of example 1.

Detailed operations of the components will be described below with reference to FIGS. 2 and 3.

<Former Half Window Frame Flag Column Generation Unit 10>

The former half window frame flag column generation unit 10 executes the third to fifth lines of Algorithm 3 (or 4) (the first line of Algorithm 2 which is a reference destination of the fifth line) according to the repetition condition of the second line of the Algorithm 3 (or 4).

Specifically, the former half window frame flag column generation unit 10 acquires a window frame start position s and a window frame end position t, and generates a bit column obtained by an OR operation performed on all bits from the end to each position as a former half window frame flag column $\{\vec{w}^f\}$ with respect to a vector subVector($\{\vec{g}\}$, s+1,i) obtained by extracting elements from the (s+1)-th element to the i-th element of $\{\vec{g}\}$ (S10).

<Latter Half Window Frame Flag Column Generation Unit 11>

The latter half window frame flag column generation unit 11 executes the third to fifth lines of Algorithm 3 (or 4) (the second line of Algorithm 2 which is a reference destination of the fifth line) according to the repetition condition of the second line of Algorithm 3 (or 4).

Specifically, the latter half window frame flag column generation unit 11 acquires a window frame start position s and a window frame end position t, and generates a bit column obtained by an OR operation performed on all bits from the head to each position as a latter half window frame flag column $\{\vec{w}^l\}$ with respect to a vector subVector($\{\vec{g}\}$, i+1,t) obtained by extracting elements from the (i+1)-th element to the t-th element of $\{\vec{g}\}$ (S11).

<Window Frame Flag Column Generation Unit 12>

The window frame flag column generation unit 12 executes the fifth line of Algorithm 3 (or 4) (the third line of Algorithm 2 which is a reference destination of the fifth line) according to the repetition condition of the second line of Algorithm 3 (or 4).

Specifically, the window frame flag column generation unit 12 generates a window frame flag column $\{\vec{w}\}$ by combining the former half window frame flag column $\{\vec{w}^f\}$ from the front side and the latter half window frame flag column $\{\vec{w}^l\}$ from the rear side having {0} interposed therebetween (S12).

Hereinafter, the Max calculation operation of the window function of the secure computation apparatus 1 of the present example will be described (refer to FIG. 2).

<End Correction Window Frame Flag Column Generation Unit 131>

The end correction window frame flag column generation unit 131 executes the sixth line of Algorithm 3 in accordance with the repetition condition of the second line of Algorithm 3.

Specifically, the end correction window frame flag column generation unit 131 generates an end correction window frame flag column $\{w^{max'\rightarrow}\}$ by combining $\{1\}$ with the end of a window frame flag column $\{w^{\rightarrow}\}$ (S131).

<Right Rotation Flag Column Generation Unit 141>

The right rotation flag column generation unit 141 executes the seventh and ninth lines of Algorithm 3 in accordance with the repetition conditions of the second and eighth lines of Algorithm 3.

Specifically, the right rotation flag column generation unit 141 generates a right rotation flag column $\{a^{max\rightarrow}\}$ by setting the 0-th row of the right rotation flag column $\{a^{max\rightarrow}\}$ to $\{1\}$ and setting elements from the first row to the (t−s)-th row of the right rotation flag column $\{a^{max\rightarrow}\}$ as elements from the 0-th row to the (t−s−1)-th row of the end correction window frame flag column $\{w^{max'\rightarrow}\}$ (S141).

<Right Rotation Boundary Flag Column Generation Unit 151>

The right rotation boundary flag column generation unit 151 executes the tenth line of Algorithm 3 in accordance with the repetition conditions of the second and the eighth lines of Algorithm 3.

Specifically, an XOR operation is performed on the right rotation flag column $\{a^{max\rightarrow}\}$ and the end correction window frame flag column $\{w^{max'\rightarrow}\}$ to generate a right rotation boundary flag column $\{b^{max\rightarrow}\}$ (S151).

<End Flag Column Generation Unit 161>

The end flag column generation unit 161 executes the eleventh line of Algorithm 3 in accordance with the repetition conditions of the second and eighth lines of Algorithm 3.

Specifically, the end flag column generation unit 151 generates an end flag column $\{m^{max'\rightarrow}\}$ by performing an AND operation on the right rotation boundary flag column $\{b^{max\rightarrow}\}$ and the end correction window frame flag column $\{w^{max'\rightarrow}\}$ (S161).

<Maximum Value Extraction Flag Column Generation Unit 171>

The maximum value extraction flag column generation unit 171 executes the thirteenth line of Algorithm 3 in accordance with the repetition condition of the second line of Algorithm 3.

Specifically, the maximum value extraction flag column generation unit 171 generates a subVector($\{m^{max'\rightarrow}\}$, 1, t−s) obtained by extracting elements from the elements of the first row to the (t−s)-th row of the end flag column $\{m^{max'\rightarrow}\}$ as a maximum value extraction flag column $\{m^{max\rightarrow}\}$ (S171).

<First Share Conversion Unit 181>

The first share conversion unit 181 executes the fourteenth line of Algorithm 3 in accordance with the repetition condition of the second line of Algorithm 3.

Specifically, the first share conversion unit 181 converts the maximum value extraction flag column $\{m^{max\rightarrow}\}$ into a maximum value extraction flag column $[[m^{max\rightarrow}]]$ (S181).

<First Product-Sum Operation Unit 191>

The first product-sum operation unit 191 executes the fifteenth line of Algorithm 3 in accordance with the repetition condition of the second line of Algorithm 3.

More specifically, the first product-sum operation unit 191 executes a product-sum operation on a subVector($[v'^{\rightarrow}]$, s, t) obtained by extracting elements from s to t of a data column $[[v'^{\rightarrow}]]$ obtained by sorting the data column $[[v^{\rightarrow}]]$ in ascending order and maximum value extraction flag column $[[m^{max\rightarrow}]]$ (S191).

Hereinafter, the Min calculation operation of the window function of the secure computation apparatus 1 of the present example will be described (refer to FIG. 3).

<Head Correction Window Frame Flag Column Generation Unit 132>

The head correction window frame flag column generation unit 132 executes the sixth line of Algorithm 4 in accordance with the repetition condition of the second line of Algorithm 4.

Specifically, the head correction window frame flag column generation unit 132 generates a head correction window frame flag column $\{w^{min'\rightarrow}\}$ by combining $\{1\}$ with the head of the window frame flag column $\{w^{\rightarrow}\}$ (S132).

<Left Rotation Flag Column Generation Unit 142>

The left rotation flag column generation unit 142 executes the seventh and ninth lines of Algorithm 4 in accordance with the repetition conditions of the second and eighth lines of Algorithm 4.

Specifically, the left rotation flag column generation unit 142 generates a left rotation flag column $\{a^{min\rightarrow}\}$ by setting the (t−s−1)-th row of the left rotation flag column $\{a^{min\rightarrow}\}$ to $\{1\}$ and setting the 0-th row to the (t−s−1)-th row of the left rotation flag column $\{a^{min\rightarrow}\}$ as elements of the first row to the (t−s)-th row of the head correction window frame flag column $\{w^{min'\rightarrow}\}$ (S142).

<Left Rotation Boundary Flag Column Generation Unit 152>

The left rotation boundary flag column generation unit 152 executes the tenth line of Algorithm 4 in accordance with the repetition conditions of the second and the eighth lines of Algorithm 4.

Specifically, the left rotation boundary flag column generation unit 152 performs an XOR operation on the left rotation flag column $\{a^{min\rightarrow}\}$ and the head correction window frame flag column $\{w^{min'\rightarrow}\}$ to generate a left rotation boundary flag column $\{b^{min\rightarrow}\}$ (S152).

<Head Flag Column Generation Unit 162>

The head flag column generation unit 162 executes the eleventh line of Algorithm 4 in accordance with the repetition conditions of the second and eighth lines of Algorithm 4.

Specifically, the head flag column generation unit 162 performs an AND operation on the left rotation boundary flag column $\{b^{min\rightarrow}\}$ and the head correction window frame flag column $\{w^{min'\rightarrow}\}$ to generate a head flag column $\{m^{min'\rightarrow}\}$ (S162).

<Minimum Value Extraction Flag Column Generation Unit 172>

The minimum value extraction flag column generation unit 172 executes the thirteenth line of Algorithm 4 in accordance with the repetition condition of the second line of Algorithm 4.

Specifically, the minimum value extraction flag column generation unit 172 generates a subVector($\{m^{min'\rightarrow}\}$, 0, t−s−1) obtained by extracting elements of the 0-th row to the (t−s−1)-th row of the head flag column $\{m^{min'\rightarrow}\}$ as a minimum value extraction flag column $\{m^{min\rightarrow}\}$ (S172).

<Second Share Conversion Unit 182>

The second share conversion unit 182 executes the fourteenth line of Algorithm 4 in accordance with the repetition condition of the second line of Algorithm 4.

Specifically, the second share conversion unit 182 converts the minimum value extraction flag column $\{m^{min\rightarrow}\}$ into a minimum value extraction flag column $[[m^{min\rightarrow}]]$ (S182).

<Second Product-Sum Operation Unit 192>

The second product-sum operation unit 192 executes the fifteenth line of Algorithm 4 in accordance with the repetition condition of the second line of Algorithm 4 (S192).

More specifically, the second product-sum operation unit 192 executes a product-sum operation on a subVector $([[v'^{\rightarrow}]], s, t)$ obtained by extracting elements from s to t of the data column $[[v'^{\rightarrow}]]$ obtained by sorting the data column $[[v^{\rightarrow}]]$ in ascending order and the minimum value extraction flag column $[[m^{min\rightarrow}]]$ (S192).

<Output Data Storage Unit 10B>

The output data storage unit 10B stores $[[k'^{\rightarrow}]]$ and $[[u^{\rightarrow}]]$ which are outputs of Algorithm 3 or 4.

MODIFIED EXAMPLES

Although the secure computation apparatus 1 of example 1 has both the Max calculation function and the Min calculation function for the window function, it may have other configurations.

For example, the secure computation apparatus of modified example 1 includes only a function of generating a window frame flag column. The secure computation apparatus of modified example 1 may not include 131, 141, 151, 161, 171, 181, 191, 132, 142, 152, 162, 172, 182, and 192. The output data storage unit 10B stores $[w^{\rightarrow}]$ which is an output of Algorithm 2.

According to the secure computation apparatus of modified example 1, a flag representing a window frame can be generated such that it can be used for the subsequent totaling processing. By utilizing this, it is possible to realize the SQL window function operation which has not been realized conventionally according to an efficient bit operation, a low-cost product-sum operation, and the like with grouping and window frame information encrypted. Therefore, the secure computation apparatus of modified example 1 contributes to improvement of the functions of the computer.

In addition, a secure computation apparatus of modified example 2 includes only the Max calculation function for the window function, for example. The secure computation apparatus of modified example 2 may not include 132, 142, 152, 162, 172, 182, and 192.

According to the secure computation apparatus of modified example 2, it is possible to realize the Max operation for the SQL window function which has not been realized conventionally according to an efficient bit operation, a low-cost product-sum operation, and the like with grouping and window frame information encrypted. Therefore, the secure computation apparatus of modified example 2 contributes to improvement of the functions of the computer.

In addition, a secure computation apparatus of modified example 3 includes only the Min calculation function for the window function, for example. The secure computation apparatus of modified example 3 may not include 131, 141, 151, 161, 171, 181, and 191.

According to the secure computation apparatus of modified example 3, it is possible to realize the Min operation for the SQL window function which has not been realized conventionally according to an efficient bit operation, a low-cost product-sum operation, and the like with grouping and window frame information encrypted. Therefore, the secure computation apparatus of modified example 3 contributes to improvement of the functions of the computer.

Figure 4:
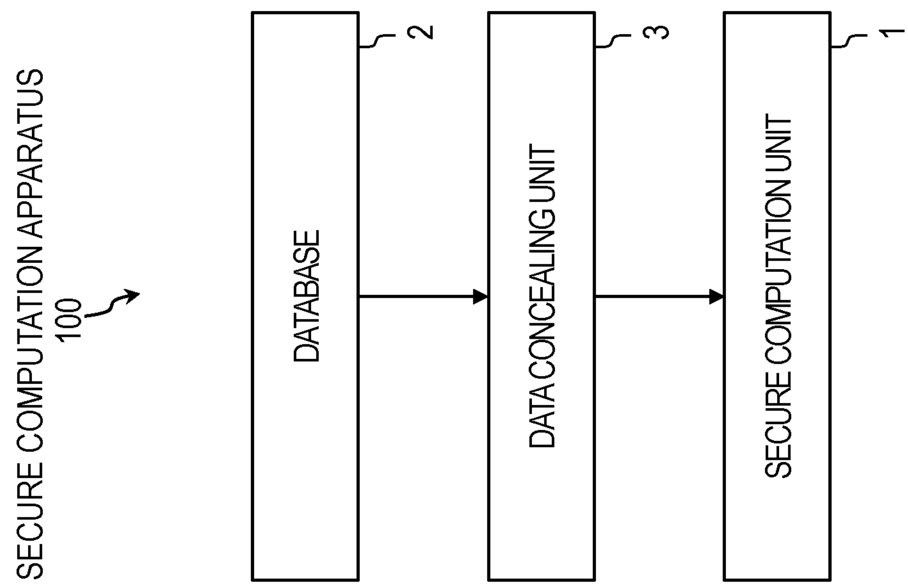
FIG. 4 is a block diagram illustrating a functional configuration of a secure computation apparatus according to modified example 4.
Figure 5:
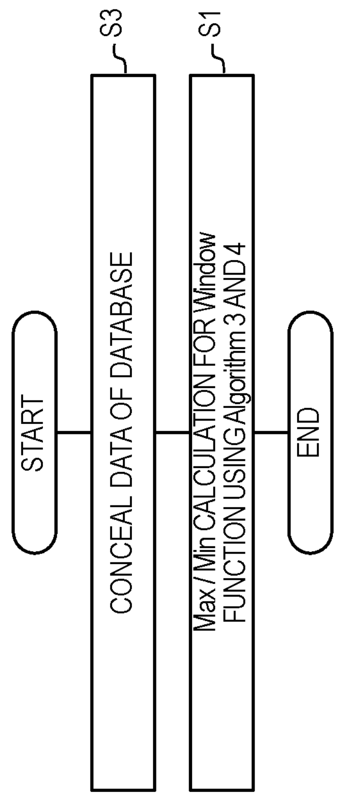
FIG. 5 is a flowchart illustrating an operation of the secure computation apparatus according to modified example 4.

Further, as shown in FIGS. 4 and 5, a secure computation apparatus may include a database 2 composed of data before concealment, a data concealing unit 3 for concealing the data of the database 2, and a secure computation unit 1 for executing the same processing as the secure computation apparatus 1 (a secure computation apparatus 100 of modified example 4, steps S3 and S1).

Additional Note

The device of the present invention includes, for example, as single hardware entity, an input unit to which a keyboard or the like can be connected, an output unit to which a liquid crystal display or the like can be connected, a communication unit to which a communication device (for example, a communication cable) capable of communication with the outside of the hardware entity can be connected, a central processing unit (CPU, which may include a cache memory, a register, and the like), a RAM or a ROM that is a memory, an external storage device that is a hard disk, and a bus for connecting the input unit, the output unit, the communication unit, the CPU, the RAM, the ROM, and the external storage device so as to allow data communication therebetween. Also, if necessary, the hardware entity may be provided with a device (drive) or the like capable of reading and writing data from/to a recording medium such as a CD-ROM. Examples of a physical entity including such hardware resources include a general-purpose computer.

Programs required to implement the above-described functions, data required to process the program, and the like are stored in the external storage device of the hardware entity (the storage device is not limited to the external storage device and, for example, the program may be stored in the ROM which is a read-only storage device). In addition, data or the like obtained by processing of these programs is appropriately stored in the RAM, the external storage device, or the like.

In the hardware entity, each program stored in the external storage device (or a ROM or the like) and data necessary for processing of each program are read to the memory as necessary, and interpreted, executed, and processed by the CPU as appropriate. As a result, the CPU realizes the prescribed functions (the respective constituting elements expressed as * unit, * means, or the like in the above description).

The present invention is not limited to the above-described example, and appropriate changes can be made without departing from the spirit of the present invention. Further, the processes described in the examples are not only executed in time series in the described order, but also may be executed in parallel or individually according to a processing capability of a device that executes the processes or as necessary.

As described above, when the processing function in the hardware entity (the device according to the present invention) described in the above-described examples is implemented by the computer, processing content of the function included in the hardware entity is written by the program. Then, by executing this program on the computer, the processing function in the above-described hardware entity is implemented on the computer.

Figure 6:
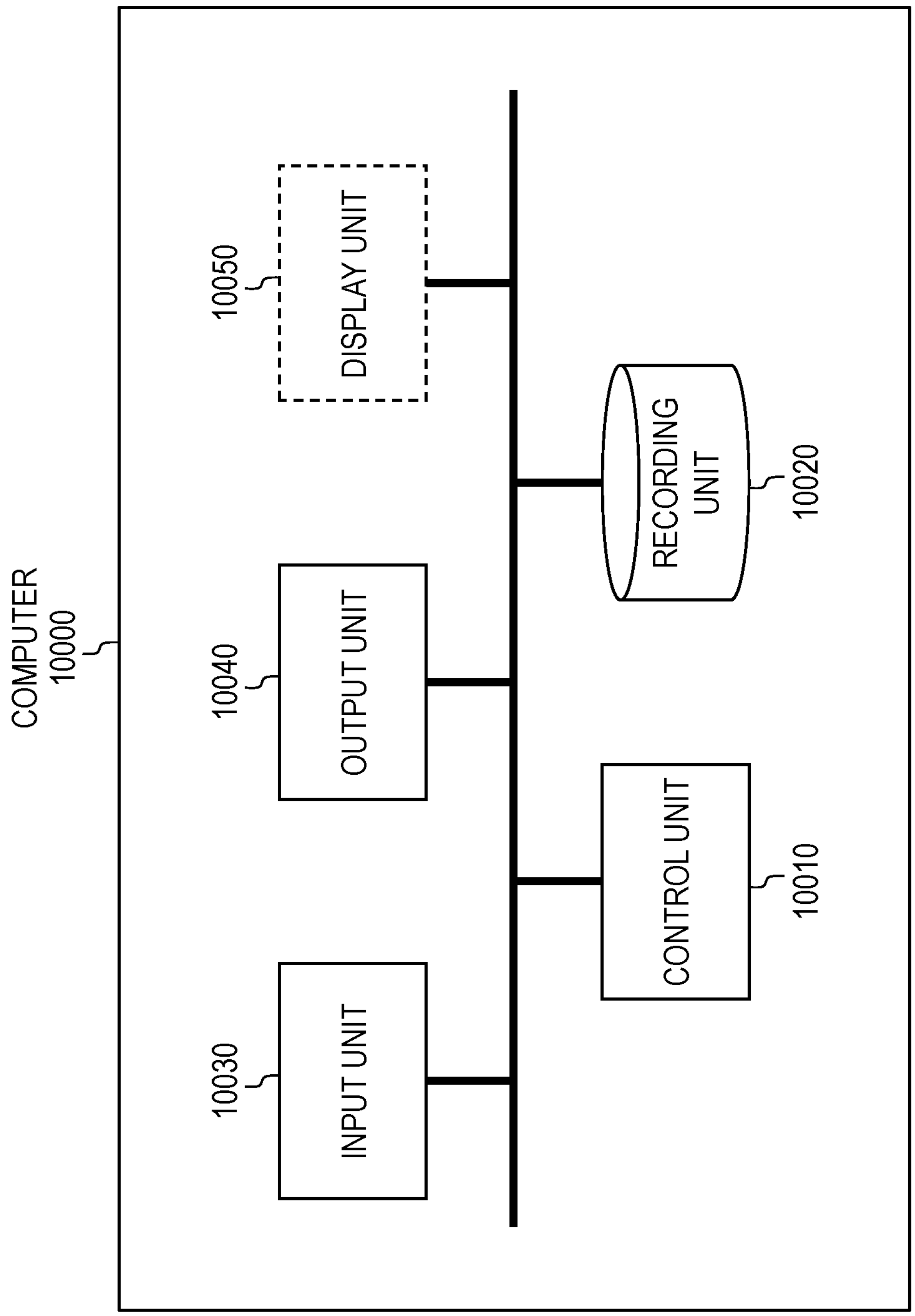
FIG. 6 is a diagram illustrating an example of a functional configuration of a computer.

The above-described various types of processing can be performed by reading a program executing each step of the foregoing methods to a storage unit 10020 of a computer 10000 illustrated in FIG. 6 and operating a control unit 10010, an input unit 10030, an output unit 10040, or the like.

A program describing this processing content can be recorded on a computer-readable recording medium. An example of the computer-readable recording medium may include any recording medium such as a magnetic recording device, an optical disc, a magneto-optical recording medium, and a semiconductor memory. Specifically, for example, a hard disk device, a flexible disk, magnetic tape, or the like can be used as the magnetic recording device, a Digital Versatile Disc (DVD), a DVD-Random Access Memory DVD-RAM), a Compact Disc Read Only Memory (CD_ROM), a CD-Recordable/Rewritable (CD-R/R), or the like can be used as the optical disk, a Magneto-Optical disc (MO) or the like can be used as the magneto-optical recording medium, and an Electrically Erasable and Programmable-Read Only Memory (EEP-ROM) or the like can be used as the semiconductor memory.

The program is distributed, for example, by sales, transfer, or lending of a portable recording medium such as a DVD or a CD-ROM on which the program is recorded. In addition, the distribution of the program may be performed by storing the program in advance in a storage device of a server computer and transferring the program from the server computer to another computer via a network.

The computer that executes such a program first temporarily stores, for example, the program recorded on the portable recording medium or the program transferred from the server computer in a storage device of the computer. Furthermore, when processing is performed, the computer reads the program stored in the own recording medium and performs the processing in accordance with the read program. In addition, as another execution mode of the program, a computer may directly read the program from a portable recording medium and execute processing in accordance with the program. Further, whenever the program is transmitted from the server computer to the computer, the processing may be performed in order in accordance with the received program. Instead of transferring the program from the server computer to the computer, the above-described processing may be executed by a so-called application service provider (ASP) type service, in which a processing function is implemented in response to an execution command and in accordance with result acquisition alone. The program in this example includes information to be provided for processing by a computer and information equivalent to the program (data which is not a direct command to the computer but has a property that defines the processing of the computer and the like).

Further, although the hardware entity is configured by a predetermined program being executed on the computer in the present example, at least a part of the processing content of the hardware entity may be realized in hardware.

The invention claimed is:

1. A secure computation apparatus for performing arithmetic operations while keeping a database including a key column $\vec{k}$ which is an attribute column and a data column $\vec{v}$ which is a value column concealed, wherein a group flag column $\vec{g}$ represents a vector in which a value becomes 1 at a position where a value of the key column changes, and a value becomes 0 at other positions, a share of a value x according to replicated secret sharing is represented as $\{x\}$, a current row number is represented by i, a window frame start position is represented by s, and a window frame end position is represented by t, a number of rows of the key column and the data column is set to 1, and the current row number i is incremented by one each time all flag column generation processing ends in a range of 0 or more and less than 1, the secure computation apparatus comprising:

processing circuitry configured to generate, with respect to a vector subVector ($\{\vec{g}\}$, s+1, i} obtained by extracting elements from an (s+1)-th element to an i-th element of $\{\vec{g}\}$, a bit column obtained by an OR operation performed on all bits from the i-th element of the vector subVector ($\{\vec{g}\}$, s+1, i) to each position as a former half window frame flag column $\{\vec{w}^{f}\}$;

generate, with respect to a vector subVector ($\{\vec{g}\}$, i+1, t} obtained by extracting elements from an (i+1)-th element to a t-th element of $\{\vec{g}\}$, a bit column obtained by an OR operation performed on all bits from i+1th element of the vector subVector ($\{\vec{g}\}$, i+1, i) to each position as a latter half window frame flag column $\{\vec{w}^{l}\}$; and generate a window frame flag column $\{\vec{w}\}$ by combining the former half window frame flag column $\{\vec{w}^{f}\}$ from a front side and the latter half window frame flag column $\{\vec{w}^{l}\}$ from a rear side having $\{0\}$ interposed between the former half window frame flag column $\{\vec{w}^{f}\}$ and the latter half window frame flag column $\{\vec{w}^{l}\}$.

2. The secure computation apparatus according to claim 1, wherein a share of the value x according to Shamir secret sharing is represented as ((x)), the secure computation apparatus comprising:

processing circuitry configured to generate an end correction window frame flag column $\{\vec{w}^{max'}\}$ by combining $\{1\}$ with the end of the window frame flag column $\{\vec{w}\}$;

generate a right rotation flag column $\{\vec{a}^{max}\}$ by setting elements from a first row to a (t−s)-th row of the right rotation flag column $\{\vec{a}^{max}\}$ as elements from a 0-th row to a (t−s−1)-th row of the end correction window frame flag column $\{\vec{w}^{max'}\}$;

perform an XOR operation on the right rotation flag column $\{\vec{a}^{max}\}$ and the end correction window frame flag column $\{\vec{w}^{max'}\}$ to generate a right rotation boundary flag column $\{\vec{b}^{max}\}$;

perform an AND operation on the right rotation boundary flag column $\{\vec{b}^{max}\}$ and the end correction window frame flag column $\{\vec{w}^{max'}\}$ to generate an end flag column $\{\vec{m}^{max'}\}$;

generate a subVector ($\{\vec{m}^{max'}\}$, 1, t−s) obtained by extracting elements from a first row to a (t−s)-th row of the end flag column $\{\vec{m}^{max'}\}$ as a maximum value extraction flag column $\{\vec{m}^{max}\}$;

convert the maximum value extraction flag column $\{\vec{m}^{max}\}$ into a maximum value extraction flag column $((\vec{m}^{max}))$; and execute a product-sum operation on a subVector ((($\vec{v}'$)), s, t) obtained by extracting elements from s to t of a data column (($\vec{v}'$)) obtained by sorting a data column (($\vec{v}$)) in ascending order and the maximum value extraction flag column $((\vec{m}^{max}))$.

3. The secure computation apparatus according to claim 1, wherein a share of the value x according to Shamir secret sharing is represented as ((x)), the secure computation apparatus comprising:

processing circuitry configured to generate a head correction window frame flag column $\{w^{min'\to}\}$ by combining {1} with the head of the window frame flag column $\{w^{\to}\}$;

generate a left rotation flag column $\{a^{min\to}\}$ by setting elements from a 0-th row to a (t−s−1)-th row of the left rotation flag column $\{a^{min\to}\}$ as elements from a first row to a (t−s)-th row of the head correction window frame flag column $\{w^{min\to}\}$;

perform an XOR operation on the left rotation flag column $\{a^{min\to}\}$ and the head correction window frame flag column $\{w^{min'\to}\}$ to generate a left rotation boundary flag column $\{b^{min\to}\}$;

perform an AND operation on the left rotation boundary flag column $\{b^{min\to}\}$ and the head correction window frame flag column $\{w^{min'\to}\}$ to generate a head flag column $\{m^{min'\to}\}$;

generate a subVector ($\{m^{min'\to}\}$, 0, t−s−1) obtained by extracting elements from a 0-th row to a (t−s−1)-th row of the head flag column $\{m^{min'\to}\}$ as a minimum value extraction flag column $\{m^{min\to}\}$;

convert the minimum value extraction flag column $\{m^{min\to}\}$ into a minimum value extraction flag column $((m^{min\to}))$; and execute a product-sum operation on a subVector ($((v'^{\to}))$, s, t) obtained by extracting elements from s to t of a data column $((v'^{\to}))$ obtained by sorting a data column $((v^{\to}))$ in ascending order and the minimum value extraction flag column $((m^{min\to}))$.

4. A non-transitory computer readable medium storing a computer program for causing a computer to function as the secure computation apparatus according to claim 1.

5. A secure computation method for performing arithmetic operations while keeping a database including a key column $k^{\to}$ which is an attribute column and a data column $v^{\to}$ which is a value column concealed, wherein a group flag column $g^{\to}$ represents a vector in which a value becomes 1 at a position where a value of the key column changes, and a value becomes 0 at other positions, a share of a value x according to replicated secret sharing is represented as {x}, a current row number is represented by i, a window frame start position is represented by s, and a window frame end position is represented by t, a number of rows of the key column and the data column is set to 1, and the current row number i is incremented by one each time all flag column generation processing ends in a range of 0 or more and less than 1, the secure computation method comprising:

generating, with respect to a vector subVector ($\{g^{\to}\}$, s+1, i} obtained by extracting elements from an (s+1)-th element to an i-th element of $\{g^{\to}\}$, a bit column obtained by an OR operation performed on all bits from the i-th element of the vector subVector ($\{g^{\to}\}$, s+1, i) to each position as a former half window frame flag column $\{w^{f\to}\}$;

generating, with respect to a vector subVector ($\{g^{\to}\}$, i+1, t} obtained by extracting elements from an (i+1)-th element to a t-th element of $\{g^{\to}\}$, a bit column obtained by an OR operation performed on all bits from i+1th element of the vector subVector ($\{g^{\to}\}$, i+1, i) to each position as a latter half window frame flag column $\{w^{l\to}\}$; and generating a window frame flag column $\{w^{\to}\}$ by combining the former half window frame flag column $\{w^{f\to}\}$ from a front side and the latter half window frame flag column $\{w^{l\to}\}$ from a rear side having {0} interposed between the former half window frame flag column $\{w^{f\to}\}$ and the latter half window frame flag column $\{w^{l\to}\}$.

6. The secure computation method according to claim 5, wherein a share of the value x according to Shamir secret sharing is represented as ((x)), the secure computation method comprising:

generating an end correction window frame flag column $\{w^{max'\to}\}$ by combining {1} with the end of the window frame flag column $\{w^{\to}\}$;

generating a right rotation flag column $\{a^{max\to}\}$ by setting elements from a first row to a (t−s)-th row of the right rotation flag column $\{a^{max\to}\}$ as elements from a 0-th row to a (t−s−1)-th row of the end correction window frame flag column $\{w^{max'\to}\}$;

performing an XOR operation on the right rotation flag column $\{a^{max\to}\}$ and the end correction window frame flag column $\{w^{max'\to}\}$ to generate a right rotation boundary flag column $\{b^{max\to}\}$;

performing an AND operation on the right rotation boundary flag column $\{b^{max\to}\}$ and the end correction window frame flag column $\{w^{max'\to}\}$ to generate an end flag column $\{m^{max'\to}\}$;

generating a subVector ($\{m^{max'\to}\}$, 1, t−s) obtained by extracting elements from a first row to a (t−s)-th row of the end flag column $\{m^{max'\to}\}$ as a maximum value extraction flag column $\{m^{max\to}\}$;

converting the maximum value extraction flag column $\{m^{max\to}\}$ into a maximum value extraction flag column $((m^{max\to}))$; and executing a product-sum operation on a subVector ($((v'^{\to}))$, s, t) obtained by extracting elements from s to t of a data column $((v'^{\to}))$ obtained by sorting a data column $((v^{\to}))$ in ascending order and the maximum value extraction flag column $((m^{max\to}))$.

7. The secure computation method according to claim 5, wherein a share of the value x according to Shamir secret sharing is represented as ((x)), the secure computation method comprising:

generating a head correction window frame flag column $\{w^{min'\to}\}$ by combining {1} with the head of the window frame flag column $\{w^{\to}\}$;

generating a left rotation flag column $\{a^{min\to}\}$ by setting elements from a 0-th row to a (t−s−1)-th row of the left rotation flag column $\{a^{min\to}\}$ as elements from a first row to a (t−s)-th row of the head correction window frame flag column $\{w^{min'\to}\}$;

performing an XOR operation on the left rotation flag column $\{a^{min\to}\}$ and the head correction window frame flag column $\{w^{min'\to}\}$ to generate a left rotation boundary flag column $\{b^{min\to}\}$;

performing an AND operation on the left rotation boundary flag column $\{b^{min\to}\}$ and the head correction window frame flag column $\{w^{min'\to}\}$ to generate a head flag column $\{m^{min'\to}\}$;

generating a subVector ($\{m^{min'\to}\}$, 0, t−s−1) obtained by extracting elements from a 0-th row to a (t−s−1)-th row of the head flag column $\{m^{min'\to}\}$ as a minimum value extraction flag column $\{m^{min\to}\}$;

converting the minimum value extraction flag column $\{m^{min\rightarrow}\}$ into a minimum value extraction flag column $((m^{min\rightarrow}))$; and executing a product-sum operation on a subVector $((v'^{\rightarrow}))$, s, t) obtained by extracting elements from s to t of a data column $((v'^{\rightarrow}))$ obtained by sorting a data column $((v^{\rightarrow}))$ in ascending order and the minimum value extraction flag column $((m^{min\rightarrow}))$.

* * * * *